Aug. 16, 1960 W. L. JONES 2,949,004
MOWER LIFT MEANS
Filed Nov. 27, 1957 3 Sheets-Sheet 1
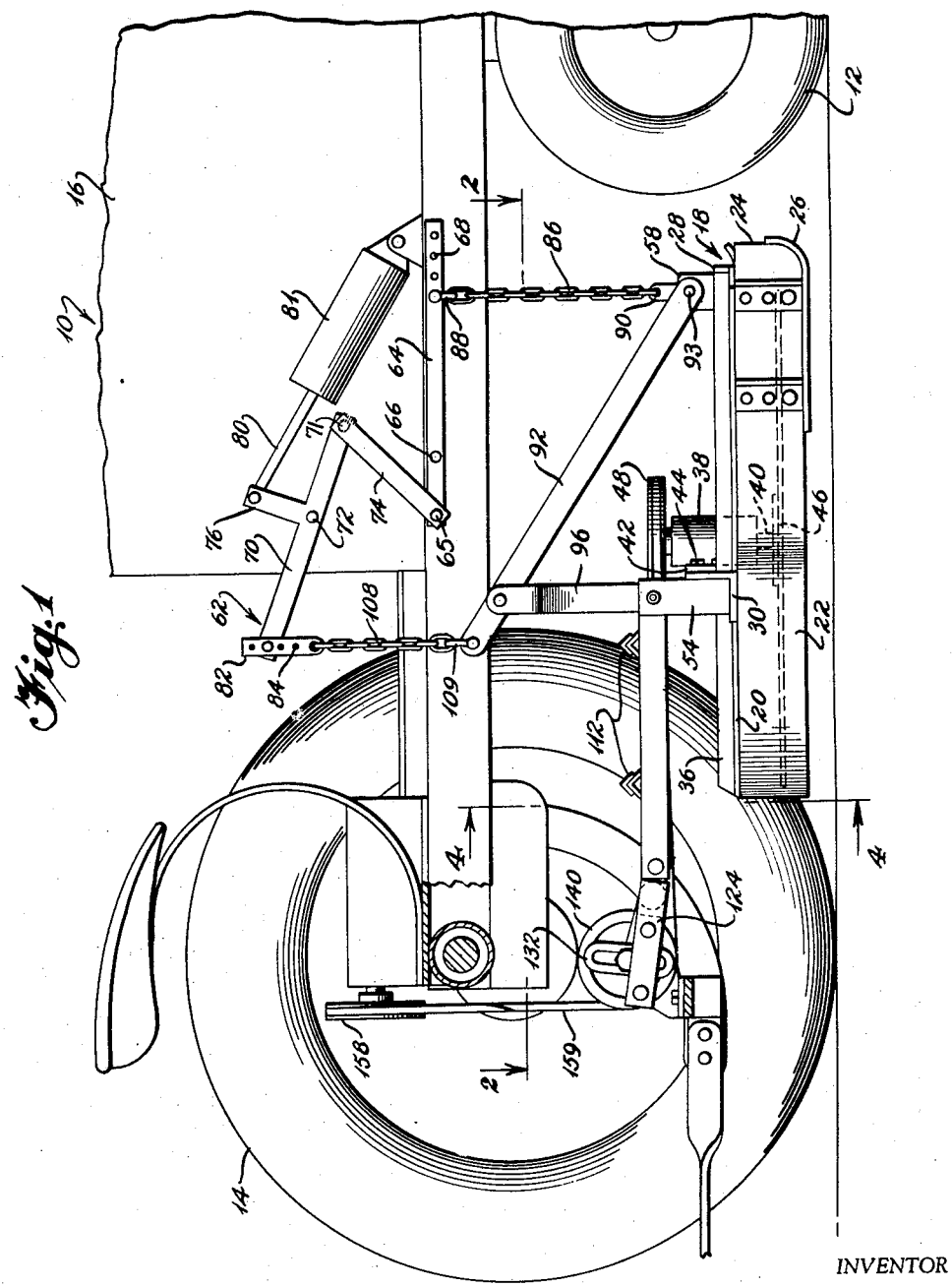
INVENTOR
William L. Jones
BY Diggins & LeFane
ATTORNEYS

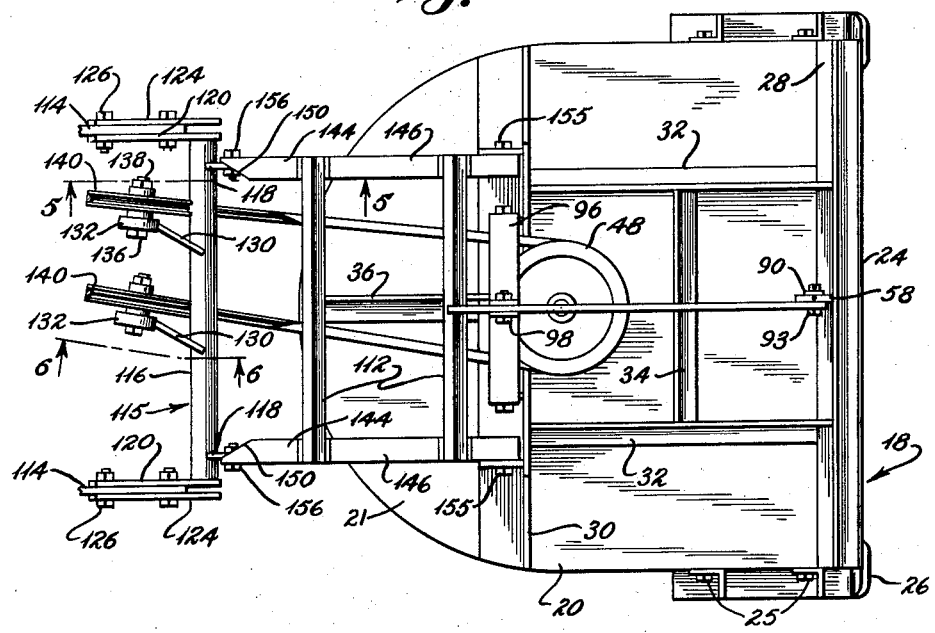
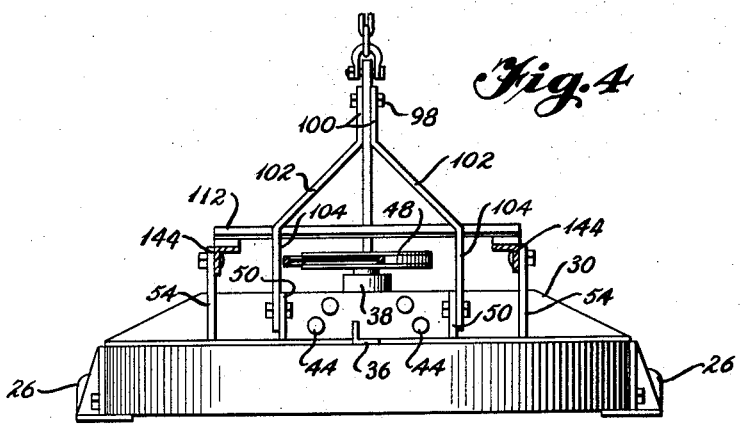

Aug. 16, 1960  W. L. JONES  2,949,004
MOWER LIFT MEANS
Filed Nov. 27, 1957  3 Sheets-Sheet 3

INVENTOR
William L. Jones
BY Diggins & LeBlanc
ATTORNEYS

United States Patent Office 2,949,004
Patented Aug. 16, 1960

2,949,004

MOWER LIFT MEANS

William L. Jones, Selma, Ala., assignor to Bush Hog Manufacturing Company, Inc., Selma, Ala., a corporation of Alabama Filed Nov. 27, 1957, Ser. No. 699,323

4 Claims. (Cl. 56—25.4)

The present invention relates to power-driven mowers and more particularly to so-called "belly mowers" which are suspended from a tractor and which will perform a satisfactory mowing or cutting operation at various levels.

Belly mowers of the type to which the present invention relates are suspended beneath a tractor between the forward and rear wheels and are designed to be driven and operated by the power take-off and other equipment of standard tractors. The mower of the present invention is designed particularly to operate with the Cub Lo-Boy, A, Super A, and 130 models of International Harvester Company.

With almost any type of tractor driven mower, it is often necessary to set the mower at different levels for different mowing operations. For example, when mowing or cutting crops from hillocks when the tractor wheels are in the furrows between hillocks, the mower would be set high, while for mowing level ground the mower would be set very low. Heretofore, mowers have been usually raised or lowered by lifting one end, thus causing the mower to tilt. This causes the mower blades to attack the vegetation at an angle and also might cause the trailing edge of the mower to drag with consequent injury to the mower.

The present invention provides a simple, inexpensive and efficient mechanism for raising and lowering a belly mower while maintaining the mower substantially horizontal and in full driving relation to the power take-off of the tractor. The invention provides a linkage for simultaneously raising the front and rear ends of the mower under the operation of the hydraulic cylinder which is standard on the tractors referred to above. The mower is maintained horizontal at all times and is efficiently driven from the power take-off of the tractor at all levels. The invention further provides a stabilizing frame for preventing lateral tilting of the mower during operation.

It is accordingly a primary object of the invention to provide a belly mower for attachment to the belly of the tractor having apparatus for raising and lowering the mower by substantially translation motion.

A further object of the invention is to provide a belly mower for attachment to the belly of a tractor having a lifting attachment for simultaneously raising the forward and rearward portions of the mower.

A further object of the invention is to provide a belly mower for attachment to a tractor having apparatus for raising and lowering the mower whereby all portions of the mower are raised or lowered equal distances.

A further object of the invention is to provide a belly mower for attachment to the belly of a tractor having a lifting linkage pivotally secured to a tractor and actuated by the tractor to simultaneously raise or lower the forward and rearward portions of the mower and a stabilizing frame extending widthwise of the mower for preventing rolling of the mower.

It is a further object of the invention to provide a belly mower for attachment to the belly of a tractor having means for stably and uniformly raising or lowering the level of the mower beneath the tractor and for maintaining a constant power transmission from the tractor to the cutter of the mower.

These and further objects and advantages of the invention will become more apparent upon reference to the following specification and claims and appended drawings wherein:

Figure 1 is a side elevation with parts broken away and with parts shown in section of a belly mower according to the invention having lifting and driving apparatus;

Figure 2 is a horizontal section view taken along the lines 2—2 in Figure 1;

Figure 4 is a fragmentary vertical section taken along lines 4—4 in Figure 1;

Figure 3:
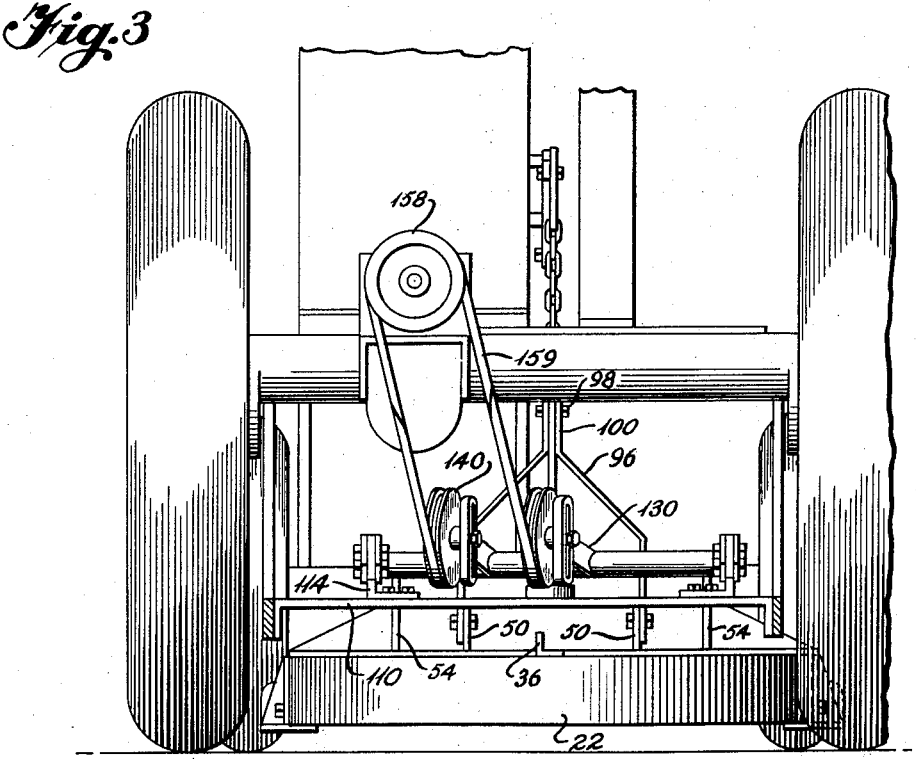
Figure 3 is a rear elevation of the belly mower shown in Figure 1.
Figure 5:
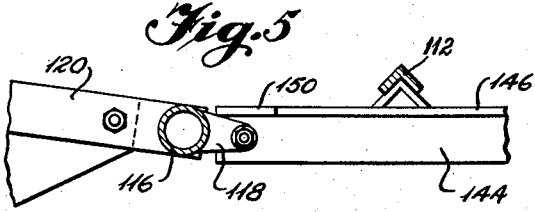
Figure 5 is a fragmentary enlarged vertical section taken along the lines 5—5 in Figure 2.
Figure 6:
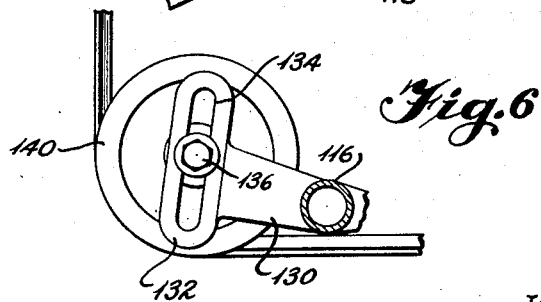
Figure 6 is a fragmentary enlarged vertical section taken along the lines 6—6 in Figure 2.

The embodiment of the invention illustrated in the drawings is shown mounted on a tractor generally indicated by the numeral 10. The belly mower of the invention may be readily mounted on a number of standard tractors, including International Models Cub Lo-Boy, A, Super A, 100, and 130. Minor changes in details of the design are required to suit the particular model upon which the belly mower is to be mounted.

A standard tractor 10 to which the mower of the present invention may be attached has forward wheels 12 and rear wheels 14 and a main body 16. Suspended below the main body of the tractor is a rotary mower generally similar to that disclosed in Patent No. 2,634,571, and generally indicated by the numeral 18. The mower includes a cover plate 20, a vertical housing 22 extending along the sides of the mower and around the curved rear portion. The mower is open at the front 24 so that matter to be cut or shredded may enter beneath the cover plate 20. Two skids 26 are secured by bolts 25 to the housing 22 at the forward end of the mower.

A plurality of angle bars are suitably secured to the cover plate 20 in a rigid manner by welding or the like, to reinforce the cover plate 20 and also to provide means for attaching the various support members and drive means to the mower. These angle members include two transverse members 28 and 30 which extend transversely across the top of the cover plate and two longitudinal members 32 which extend between the members 28 and 30 on opposite sides of the center line of the mower. A third transverse member 34 may be positioned between the longitudinal members 32 and a further longitudinal member 36 may extend from the transverse member 30 to the curved rear 21 of the cover plate 20. These channel members are normally welded to the cover plate and also to each other.

The cutter blade shaft 40 is rotatably journaled in a housing 38 mounted on a bracket 42 and this bracket 42 is rigidly secured to the upright portion of the channel 30 by bolts 44. The cutter blades 46 are suitably secured to the lower end of the drive shaft 40, and a pulley 48 is fixed to the upper end of the shaft 40 to rotate the shaft 40 and blade 46.

In order to serve as a base for the connection of a lifting mechanism, subsequently described, there are secured to angle member 30 two inner vertical plates 50 (Figure 3) having holes formed therein and two taller outer vertical plates 54 having holes formed in the upper ends thereof. Also, a single central vertical plate 58 is secured to the forward end of the cover plate 20 and has a hole formed therein.

The mechanism for suspending the mower from beneath the tractor 10 and for raising and lowering the mower is generally indicated by the numeral 62 and includes a lever 64 pivotally secured at pivot point 66 to the main body 16 of the tractor. An upper lever arm 70 is pivotally secured to the tractor at pivot point 72 which is spaced upwardly and rearwardly from pivot point 66 and connecting link 74 is pivotally connected to the adjacent ends of lower lever arm 64 and upper lever arm 70 at 65 and 71 respectively.

The upper lever arm 70 has an integral extension 76 extending upwardly therefrom adjacent the pivot 72 and the piston rod 80 of a hydraulic cylinder 81 pivotally engages the outer end of the arm 76. The piston 81 and piston rod 80 are pivotally secured to the main frame of the tractor and are standard equipment on the types of tractors to which this invention is applicable.

The outer free end of the lever 64 is provided with a plurality of holes 68 and a flexible chain 86 is secured to the lever 64 by a shackle 88 having a bolt which can be secured in any one of the holes 68. The lower end of the chain 86 is pivotably connected to the upright plate 58 by a link 90 so that the forward end of the mower is supported from the lever 64 by the chain 86.

A bar 92 is bolted at its forward end to the upright plate 58 by a bolt 93 and extends upwardly and rearwardly between a pair of struts indicated at 96 (Figure 1) and is rigidly secured to the struts 96 by bolt 98. The struts 96 consist of spaced vertical portions 104 secured to the upright plates 50 and inwardly inclined portions 102 which terminate in vertical portions 100 on either side of the bar 92.

A link 82 is pivotally attached to the outer free arm of the lever 70 and carries a chain 108 which is secured to the outer end of the bar 92 by a shackle 109. The link 102 is provided with a plurality of openings 84 so that it may be pivotally attached to the lever arm 70 at different elevations. Mowers of different sizes may be accommodated and uniformity of elevation of the mower may be obtained by selecting the appropriate holes 68 and 84 for attachment of the chains 86 and 108 to the respective lever arms 64 and 70.

The draw bar 110 of a tractor such as the Cub Lo-Boy of International Harvester may be provided with spaced side portions 114 and a stabilizing frame 115 secured to the portions 114 of the draw bar, stabilizes the mower and holds it against lateral tilting.

As shown in Figure 2, the rear portion of the stabilizing frame comprises two pairs of spaced plates 120 and 124 and the draw bar portions 114 are clamped between plates 120 and 124 by bolts 126. A transverse rod or bar 116 is secured at the forward ends of plates 120 and this bar 116 is provided with two forwardly extending ears 118. Angle or channel bars 144 are pivotally connected at their rear ends to the ears 118 by standard bushing and bolt assemblies 156 and are pivotally connected at their forward ends to ears or plates 54 by standard bolt and bushing assemblies 155. The ears or plates 54 are rigidly secured as by welding or the like to the angle members 30 on the mower. Transverse braces 112 secured to upper flanges 146 are provided between the bars 144 to prevent lateral swinging of the mower.

Idler pulley brackets 130 are rigidly secured to the bar 116 and are provided at their enlarged ends 132 with vertical slots 134 to permit vertical adjustment of the idler pulleys 140. The idler pulleys may be locked in selected positions in the slots 134 by bolts 136.

In the type of tractor referred to, the power take-off pulley 158 rotates on a horizontal axis and a drive belt 159 extends around the power take-off pulley 158 beneath the two idler pulleys 140 and around the cutter blade drive pulley 48. There is no substantial change in the spacing between the various pulleys during raising or lowering of the mower so that there is no necessity for provision for maintaining the belt in taut condition.

The mower of the present invention may be simply and quickly attached to a tractor. Pivots 72 and 66 are attached to the tractor frame and the piston rod 80 is pivotally attached to the arm 76 of the lever 70. The plates 120 and 124 are secured to the portions 114 or draw bar and the chains 86 and 108 are connected to their respective levers 64 and 70 preferably with the mower in its lowest position.

When the cylinder 81 is actuated pulling piston rod 80 to the right as shown in Figure 1, the lever arm 70 will rise and pressure will be applied on the left hand end of the lever 64 through the link 74 thus causing the right hand end of the lever 64 also to rise. Thus both the front and rear ends of the mower are raised simultaneously. It is important that the mower have a slight tilt forward when in its lowest position and, by proper proportioning of the lever arms, this tilt may be maintained at all levels.

The rectangular frame formed by the rods 144, pivoted at its rear end to the fixed bar 116 and at its forward end to the mower, holds the mower against lateral tipping or tilting at all times and prevents transverse swinging. Ordinarily these mowers are not operated at a distance much greater than five inches from the ground and that amount of movement does not cause any appreciable increase or decrease in the tension in the drive belt.

The apparatus of the present invention may be applied to numerous tractors with slight variation due to minor differences in tractor design.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. A device for attachment to a tractor and adapted to adjust the height of a mower suspended below the tractor between the front and rear wheels thereof, said device comprising a lower lift arm having a pivot point intermediate its ends for pivotal attachment to a tractor, an upper lift arm positioned above said lower lift arm and having a pivot point intermediate its ends for pivotal attachment to a tractor, the pivot point of said upper lift arm being rearwardly displaced from the pivot point of said lower lift arm, a connecting link extending between the proximate ends of said upper and lower lift arms and pivotally attached thereto, a first chain extending from the end of said lower lift arm remote from said end attached to said connecting link downwardly for attachment to a mower, a bracing bar secured to the lower end of said first chain and extending rearwardly and upwardly, a pair of struts secured to the rearward portion of said bracing bar and extending downwardly for attachment to a mower, a second chain extending from the end of said upper lift arm remote from said end attached to said connecting link downwardly to and secured to the rearward end of said bracing bar, and means secured to said upper lift arm for engagement by a source of forward torque on a tractor, whereby the application of a forward torque to said engagement means causes a pivoting of said lift arms to effect a simultaneous raising of said first chain and said pair of struts.

2. In a mower, a mobile frame, a mower element below said frame, a pair of levers pivotally mounted on said frame above said mower element, a link pivotally interconnecting the left end of one of said pair of levers with the right end of the other lever, support means interconnecting the remote ends of said levers and spaced points on said mower element, power lift means connected to at least one of said levers, and a stabilizer means connecting said mower and said frame.

3. Apparatus as set out in claim 2 wherein the pivotal mounting of said pair of levers have different elevations with respect to said mobile frame.

4. Apparatus as set out in claim 2 wherein said support means is selectively attachable to one of a number of positions adjacent the end of said pair of levers so that the pivoting of said levers effects a substantially translational movement of said mower element through said support means.

References Cited in the file of this patent

UNITED STATES PATENTS

| | | |
|---|---|---|
| 1,262,889 | Wheatley | Apr. 16, 1918 |
| 2,369,850 | Powers | Feb. 20, 1945 |
| 2,483,683 | Wells et al. | Oct. 4, 1949 |
| 2,492,962 | Bohmker et al. | Jan. 3, 1950 |
| 2,680,946 | Rousey | June 15, 1954 |
| 2,681,536 | Kuhary et al. | June 22, 1954 |
| 2,801,510 | Colburn | Aug. 6, 1957 |
| 2,805,580 | Kane | Sept. 10, 1957 |